United States Patent [19]

Lundqvist

[11] Patent Number: 4,621,507
[45] Date of Patent: Nov. 11, 1986

[54] DISTRIBUTING DEVICE FOR SUSPENSIONS

[75] Inventor: Weine Lundqvist, Karlstad, Sweden

[73] Assignee: Kamyr AB, Karlstad, Sweden

[21] Appl. No.: 718,388

[22] Filed: Apr. 1, 1985

[30] Foreign Application Priority Data

Apr. 2, 1984 [SE] Sweden ............................... 8401790

[51] Int. Cl.⁴ .............................................. D06B 23/16
[52] U.S. Cl. .............................. 63/181 R; 137/561 A; 137/565.1; 239/222.13; 239/231; 239/504
[58] Field of Search ............................ 162/17, 52, 246; 68/181 R; 366/305, 306, 264; 137/561 A, 565.1, 625.15, 876; 239/222.13, 222.15, 231, 225, 246, 504

[56] References Cited

U.S. PATENT DOCUMENTS

| | | | |
|---|---|---|---|
| 2,351,492 | 6/1944 | Cowles | 366/264 |
| 2,764,011 | 9/1956 | Richter | 68/181 R |
| 2,990,710 | 7/1961 | Burling | 68/181 R |
| 3,053,067 | 9/1962 | Frykhult | 68/181 R |
| 3,053,068 | 9/1962 | Leffler | 68/181 R |
| 3,053,069 | 9/1962 | Leffler | 68/181 R |
| 3,218,040 | 11/1965 | Richter | 259/23 |
| 3,882,016 | 5/1975 | Green | 209/169 |
| 3,888,417 | 6/1975 | Harmon | 239/231 |
| 3,912,236 | 10/1975 | Zipperer et al. | 366/264 |
| 4,062,526 | 12/1977 | Green | 366/264 |

Primary Examiner—S. Leon Bashore
Assistant Examiner—Andrew J. Anderson
Attorney, Agent, or Firm—Nixon & Vanderhye

[57] ABSTRACT

A simple and easy to construct distributing apparatus is provided for distributing of suspensions, such as paper pulp, into a treatment vessel such as a bleach tower. The vessel has an inlet opening in a wall thereof, and a rotatable shaft has a first end extending into the vessel through the inlet opening. A tubular skirt surrounds the shaft. The skirt has first and second ends and an inside diameter greater than the diameter of the inlet opening, and one or more radial openings in the skirt. An annular cone frustum is provided as a connecting component extending between the first end of the shaft and the first end of the skirt for mounting the skirt so that its second end is adjacent and substantially concentric with the vessel inlet opening. A stationary baffle component surrounds the rotating skirt, and includes a plurality of vanes disposed substantially concentrically with and extending generally radially outwardly from the skirt, each having a free end spaced from the vessel wall, and an annular baffle in the form of a cone frustum, connected to the free ends of the vanes. The conical surfaces of the shaft connecting component and the annular baffle are substantially the same, with one conical surface essentially being an extension of the other. The vanes may be planar, disposed at a small angle with respect to the radial, or curved.

20 Claims, 4 Drawing Figures

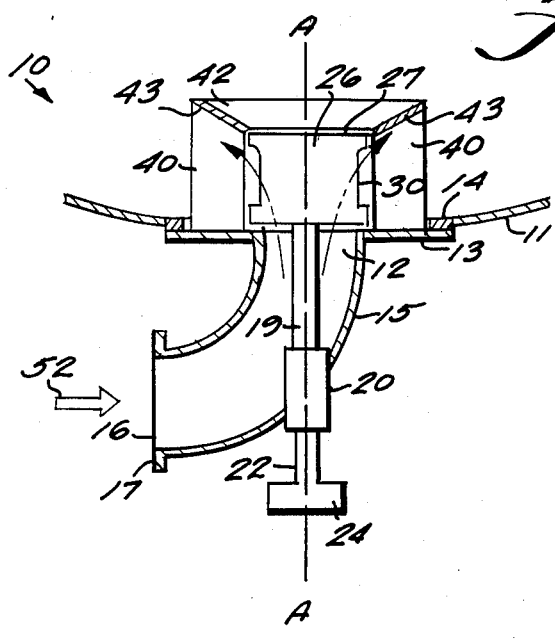
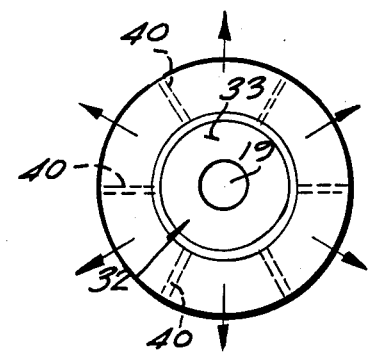
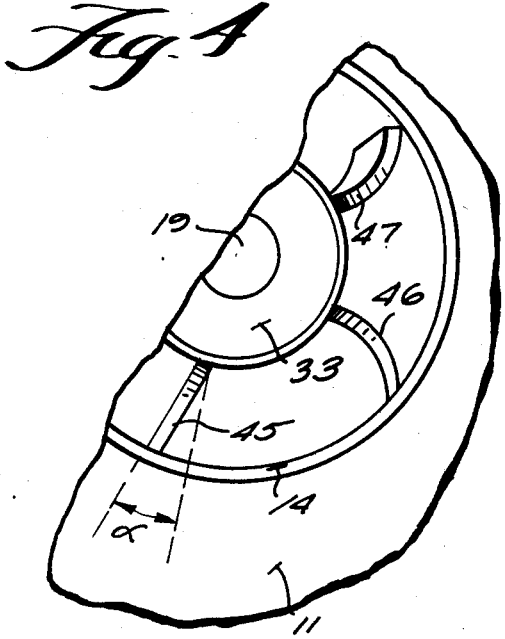
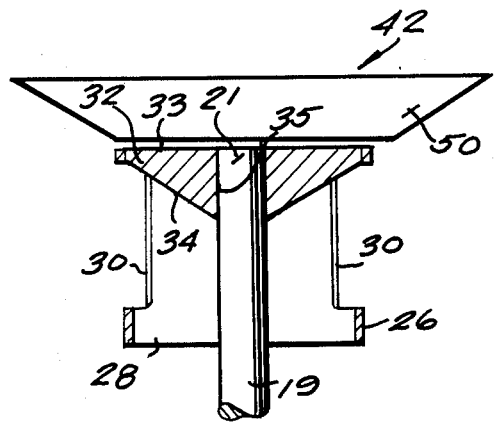

DISTRIBUTING DEVICE FOR SUSPENSIONS

BACKGROUND AND SUMMARY OF THE INVENTION

The invention relates to apparatus for distributing fluent materials into a vessel. The invention has particular applicability for distribution of suspensions, such as comminuted cellulosic fibrous material suspensions (paper pulp), into a treatment vessel. Particularly in the bleaching of paper pulp, it is important that the pulp being fed into the bleach tower be evenly distributed into the vessel so that channeling, and resulting uneven treatment of different portions of the pulp, is avoided.

There are a number of different types of known apparatus for distributing pulp into bleaching towers or the like, such as shown in prior U.S. Pat. Nos. 2,764,011; 3,053,068; 3,053,069; and 3,218,040. While these structures can effectively distribute the pulp into the vessel, they are more complicated and costly than is desired. The distributing apparatus according to the present invention is capable of evenly distributing paper pulp into a bleach tower or the like, yet is significantly simpler and less expensive than a number of prior art devices, and because of the efficiency of its operation can be made smaller than a number of different known devices while still being able to handle the same quantity of pulp.

According to one aspect of the invention there is provided an apparatus for distributing a suspension into a vessel, which vessel has an inlet opening, with a given diameter, in a wall thereof. The apparatus comprises: A rotatable shaft having a first end extending into the vessel through the inlet opening. A tubular skirt having first and second ends, and an inside diameter greater than the diameter of the inlet opening, and means defining at least one radial extending opening in the skirt. Connecting means for connecting the skirt to the shaft so that the skirt is substantially concentric with the shaft and rotatable therewith, the connecting means comprising a connecting component extending between the first end of the shaft and the first end of the skirt and mounting the skirt so that the second end thereof is adjacent and substantially concentric with the inlet opening. And, baffle means stationarily mounted to the vessel adjacent and surrounding the inlet opening, for directing the flow of suspension introduced into the vessel through the tubular skirt, the baffle means comprising: a plurality of vanes disposed substantially concentrically with and surrounding the skirt, and extending generally radially outwardly from the skirt, each having a free end thereof spaced from the vessel wall; and an annular baffle connected to the vanes at the free ends thereof.

The component for connecting the skirt to the shaft preferably comprises a cone frustum having a conical surface disposed within the volume defined by the skirt, and flaring outwardly from the shaft to the skirt. The annular baffle also preferably comprises a cone frustum mounted concentrically with the shaft and skirt, and having a conical surface flaring outwardly from the skirt. The conical surfaces preferably are in-line, one being essentially a continuation of the other, so that they cooperate together to properly direct the flow of suspension into the vessel.

A wide variety of modifications of the distributing apparatus according to the invention are possible. For instance for the opening(s) in the skirt, a pair of rectangular openings can be provided, disposed on opposite sides of the shaft. The vanes may be planar truly radially extending members, or may be curved, or may be planar members which are disposed at an angle with respect to the radial, depending upon the exact manner in which it is desired to introduce pulp into the vessel.

It is the primary object of the present invention to provide a simple, yet effective, distributing device, particularly for the introduction of paper pulp into a bleaching vessel or the like. This and other objects of the invention will become clear from an inspection of the detailed description of the invention, and from the appended claims.

BRIEF DESCRIPTION OF THE DRAWINGS

FIG. 1 is a side view, partly in cross-section and partly in elevation, of exemplary apparatus according to the present invention shown installed in the bottom wall of a paper pulp bleach tower;

FIG. 2 is a top plan view of the apparatus of FIG. 1, as seen from inside the bleach tower;

FIG. 3 is a side detail view, showing the skirt and connecting component in cross-section and showing the shaft and annular baffle in elevation, with the vanes removed for clarity of illustration; and FIG. 4 is a partial top plan view, with the annular baffle removed for clarity of illustration, of a modified form of exemplary apparatus according to the invention.

DETAILED DESCRIPTION OF THE DRAWINGS

Exemplary distributing apparatus according to the present invention is shown generally by reference numeral 10 in the drawings, and in FIG. 1 is shown in operative association with a bottom wall of a conventional paper pulp treatment vessel 11, such as a bleaching tower. The vessel 11 has an inlet opening 12 therein of a given diameter, formed in the bottom wall, and through which pulp is adapted to be introduced into the vessel 11. While in the exemplary embodiment illustrated the device 10 will be described with respect to its placement in the bottom wall of a vessel 11, it is to be understood that the device 10 is equally applicable to the top, sides, or other portions of any suitable treatment vessel.

In the embodiment illustrated in FIG. 1, the inlet opening 12 is formed as a central opening in a plate 13 which is connected (e.g. removably connected) by an annular flange 14 to the bottom wall of the vessel 11. Extending outwardly from the plate 13 is a pipe elbow 15 connected at one end thereof to the inlet opening 12, and having an opening 16 at the opposite end thereof, with surrounding flange 17. The flange 17, which typically is in a plane perpendicular to the plate 13, can be connected to a pump, additional conduits, or other apparatus for delivering the suspension to the elbow 15, and ultimately the vessel 11.

A primary component of the distributing device 10 comprises a shaft 19. The shaft 19 is mounted for rotation with respect to the vessel 11, preferably by bearing means 20 operatively connected to a portion of the pipe elbow 15. The bearing means 20 can be of any conventional construction, such as a pair of roller bearings and stuffing box, or the like. The shaft 19 is mounted by the bearing 20 for rotation about an axis essentially perpendicular to the plate 13 and concentric with opening 12;

e.g. a vertical axis A—A for the embodiment illustrated in FIG. 1.

The shaft 19 has a first end 21 (see FIG. 2), and a second end 22 opposite the end 21. The first end 21 extends into the vessel 11 through the inlet opening 12, while the second end 22 is operatively connected to a suitable power means, shown schematically at reference numeral 24 in FIG. 1, for effecting rotation of the shaft 19 about its axis A—A. The power means 24 may be any suitable conventional device for rotating the shaft 19, such as a motor connected by a V belt to the shaft, or by a speed reducer, direct coupling, or the like.

The apparatus 10 also includes as a primary component thereof a tubular skirt 26, which preferably is merely a metal sleeve having open first and second ends 27, 28, respectively. As readily apparent in FIG. 3, the tubular skirt 26 is hollow with no internal divisions or components except the shaft 19. The skirt 26 has at least one generally radially extending opening therein; two such openings 30 being illustrated in FIGS. 1 and 3. Note that the openings 30 are symmetrically disposed on opposite sides of the shaft 19, and in the embodiment illustrated in the drawings are rectangular in shape, with the longest side of the rectangle extending axially. For certain situations only one opening 30 might be provided, or more than two openings.

Preferably, the diameter of skirt 26 is slightly greater than the diameter of inlet 12. Also, the cross-sectional area of flow of suspension at inlet 12 (the area of the inlet minus that of the shaft 19) is approximately equal to the area of the opening(s) 30 (i.e. for the embodiment illustrated in the drawings the area of each opening 30 is about one-half the flow area of inlet 12).

A third major component of the distributing apparatus 10 comprises connecting means for connecting the skirt 26 to the shaft 19 so that the skirt 26 is substantially concentric with the shaft 19 and rotatable therewith. The connecting means preferably comprises a connecting component 32 (see FIGS. 2 and 3) which comprises an annular cone frustum having a base 33 and a conical surface 34, and a through-extending central opening 35. The component 32 is connected between the first end 21 of the shaft 19 and the first end 27 of the skirt 26. As seen in FIG. 2, the shaft 19 extends through the central opening 35 in the component 32, so that the base 33 of the cone frustum is flush with the shaft 19, and extends in a plane perpendicular to the axis A-A. The conical surface 34 is disposed within the volume defined by the skirt 26, and flares outwardly from the shaft 19 to the skirt 26. The conical surface 34 thus deflects pulp flowing upwardly through the opening 12 and into the skirt 26 so that it moves generally radially outwardly through the openings 30, as illustrated by the arrows in FIGS. 1 and 3.

The distributing apparatus 10 also comprises a stationary component. The stationary component is mounted within the vessel 11 generally surrounding the opening 12. In the preferred embodiment illustrated in the drawings, the stationary component comprises baffle means for directing the fluent material flowing through the openings 30 into the vessel 11 so that it is evenly distributed within the vessel 11, the baffle means comprising a plurality of vanes 40, and an annular baffle 42.

Each of the vanes 40 is disposed substantially concentrically with and surrounding the skirt 26, and extends generally radially outwardly from the skirt, and each has a free end 43 thereof spaced from the vessel wall (e.g. from the plate 13). The vanes 40 are stationarily mounted to the vessel, as by being welded or otherwise attached to the plate 13.

In FIGS. 1 and 2, the vanes 40 are illustrated as planar elements which extend axially and are truly radially extending outwardly from the shaft 19. However in some circumstances the vanes may be disposed at an angle with respect to the radial, may be curved, and may be tilted slightly out of an axial plane. For instance in FIG. 4 the vane 45 is shown as a planar element which has a positive angle $\alpha$ (e.g. 10°) with respect to the radial, the vane 46 is illustrated as a curved axially extending element, and the vane 47 is illustrated as an element that is not only curved but is bent slightly out of true axial alignment. Any desired construction of the vanes can be provided in order to effect even distribution of fluent material within the vessel 11 given the dimensions and shape of that vessel.

The annular baffle 42 preferably comprises a second cone frustum, which has a conical surface 50 which flares outwardly from the skirt 26. The conical surface 50 of this cone frustum is concentric with the skirt 26 and shaft 19, and the free ends 43 of the vanes 40 are welded, or otherwise attached, to the surface 50. As can be seen in FIG. 3, the conicity of the surface 50 is substantially the same as that of the surface 34, and they are disposed with respect to each other so that the surface 50 is essentially a geometrical extension of the surface 34. This provides for even deflection of the fluent material as it is flowing through the openings 30 into the bottom of the vessel. The fluent material will be directed substantially radially outwardly, as indicated by the arrows in FIG. 2.

It will be seen that the construction of the device 10 is very simple—being formed of pipes, plates, and other simple components. The plate 13 can be made readily removable (as by attaching it with bolts to flange 14), or the vanes 40 and annular baffle 42 can be fixed (e.g. welded) to the vessel 11 and the elbow 15 equiped with a smaller flange removably fastened to a corresponding flange in the vessel 11.

Operation

During a typical operation of the apparatus illustrated in the drawings, for the particular circumstance in which paper pulp is to be bleached in a bleaching tower (comprising the vessel 11), the pulp is introduced, as indicated by the arrow 52 in FIG. 1, into the open end 16 of the pipe elbow 15 to flow upwardly through the inlet 12 into the hollow interior of the skirt 26, which is concentric with, and adjacent, the inlet 12. The power means 24 continuously rotates the shaft 19 about its axis A—A. The speed of rotation is relatively low, and usually will be dependent upon the throughput rate of the suspension. Typically the shaft 19 would be rotated at about 10-25 rpm.

The pulp entering the skirt 26 through the open end 28 thereof flows upwardly, is deflected by the conical surface 34, and passes in the direction of the arrows through the openings 30, the entire time that the skirt 26 is being rotated. Once the pulp exits the skirt 26 it is directed by the vanes 40 and the conical surface 50 of the annular baffle 42 so that it is essentially evenly distributed within the vessel 11, so that channeling—and uneven bleaching that results therefrom—is essentially avoided.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and devices.

What is claimed is:

1. Apparatus for distributing a suspension into a vessel having an inlet opening, with a given diameter, in a wall thereof, comprising:
   a rotatable shaft having a first end extending into the vessel through said inlet opening;
   a tubular skirt having first and second ends, an interior volume, and an inside diameter greater than said diameter of said inlet opening, and means defining at least one radial extending opening in said skirt;
   connecting means for connecting said skirt to said shaft so that said skirt is substantially concentric with said shaft and rotatable therewith, said connecting means comprising a connecting component extending between said first end of said shaft and said first end of said skirt and mounting said skirt so that said second end thereof is adjacent and substantially concentric with said inlet opening, so that the interior volume of the tubular skirt is open except for said connecting component, and
   baffle means stationarily mounted to said vessel adjacent and surrounding said inlet opening, for directing the flow of suspension introduced into the vessel through said tubular skirt, said baffle means comprising: a plurality of vanes disposed substantially concentrically with and surrounding said skirt, and extending generally radially outwardly from said skirt, each having a free end thereof spaced from the vessel wall; and an annular baffle connected to said vanes at said free ends thereof.

2. Apparatus as recited in claim 1 further comprising a pipe elbow operatively connected to said vessel at said inlet opening and extending outwardly therefrom; bearing means operatively connected to said pipe elbow and receiving said rotatable shaft therein; and power means operatively connected to said shaft at the opposite end thereof from said first end, said power means comprising means for rotating said shaft with respect to said pipe elbow and said vessel.

3. Apparatus as recited in claim 1 wherein said means defining at least one radially extending opening in said tubular skirt comprises means defining a pair of generally rectangular openings in said skirt, disposed on opposite sides of said shaft, and having the longest side dimension thereof axially extending.

4. Apparatus as recited in claim 1 wherein said annular baffle comprises a cone frustum having a conical exterior surface flaring outwardly from said skirt, said vane free ends connected to said conical surface.

5. Apparatus as recited in claim 4 wherein said connecting component comprises a cone frustum having a conical surface flaring outwardly from said shaft to said skirt.

6. Apparatus as recited in claim 5 wherein said conical surface of said annular baffle and said conical surface of said connecting component have approximately the same conicity, so that one surface is substantially a geometrical extension of the other.

7. Apparatus as recited in claim 5 wherein said connecting component cone frustum comprises a planar base which is flush with said shaft first end and perpendicular to the direction of elongation of said shaft.

8. Apparatus as recited in claim 1 wherein said connecting component comprises a cone frustum having a conical surface flaring outwardly from said shaft to said skirt.

9. Apparatus as recited in claim 4 wherein said vanes are planar elements extending radially outwardly as geometric extensions from the center of said shaft.

10. Apparatus as recited in claim 4 wherein said vanes are planar elements which make a positive angle with respect to a radial geometric extension from the center of said shaft.

11. Apparatus as recited in claim 4 wherein said vanes are curved.

12. Apparatus as recited in claim 1 wherein the cross-sectional area of flow of suspension at said inlet opening is approximately equal to the total area of said at least one opening in said skirt.

13. Apparatus as recited in claim 2 wherein said inlet opening is disposed in the bottom wall of said vessel, and said shaft extends so that its axis of rotation is essentially vertical.

14. A fluent material distributing device comprising:
   a rotating component comprising: a shaft rotatable about an axis; a tubular skirt having first and second ends, an interior volume, said second end being open, and means defining at least one generally radially extending opening in said skirt; connecting means for connecting said skirt to said shaft so that said skirt is concentric with said shaft and rotatable therewith, said connecting means comprising a connecting component extending between said shaft and said first end of said skirt, so that the interior volume of the tubular skirt is open expect for said connecting component; and
   a stationary component unconnected to said rotating component and stationary with respect thereto, and comprising: baffle means comprising a plurality of vanes disposed substantially concentrically with and surrounding said skirt, and extending generally radially outwardly from said skirt, each having a free end thereof; and an annular baffle comprising a cone frustum having a conical surface, said cone frustum connected to said vanes at said free ends thereof, said annular cone frustum being concentric with said skirt and shaft, and said conical surface thereof flaring outwardly from said shaft.

15. A device as recited in claim 14 wherein said cone frustum comprises a first cone frustum, and wherein said connecting component comprises a second cone frustum having a conical surface disposed within the volume defined by said tubular skirt, and flaring outwardly with respect to said tubular skirt.

16. A device as recited in claim 15 wherein said conical surfaces of said first and second cone frustums have substantially the same conicity, so that one surface is substantially an extension of the other.

17. A device as recited in claim 15 wherein said means defining at least one radially extending opening in said tubular skirt comprises means defining a pair of generally rectangular openings in said shaft, disposed on opposite sides of said shaft, and having the longest side dimension thereof axially extending.

18. A device as recited in claim 15 wherein said vanes are planar elements extending radially outwardly as geometric extensions from the center of said shaft.

19. A fluent material distributing device comprising:
a rotating component comprising: a shaft rotatable about an axis; a tubular skirt having first and second ends, an interior volume, said second end being open, and means defining at least one generally radially extending opening in said skirt; connecting means for connecting said skirt to said shaft so that said skirt is concentric with said shaft and rotatable therewith, said connecting means comprising an annular connecting component comprising a cone frustum extending between said shaft and said first end of said skirt, said frustum having a conical surface contained within the volume defined by said skirt and flaring outwardly from said shaft toward said skirt, and so that the interior volume of the tubular shaft is open except for said connecting component; and
a stationary component unconnected to said rotary component, and stationary with respect thereto, and comprising: baffle means for directing flow of fluent material from said at least one opening in said skirt, said baffle means comprising a plurality of vanes disposed substantially concentrically with and surrounding said skirt, and extending generally radially outwardly from said skirt, each having a free end thereof; and an annular baffle operatively connected to said vanes at said free ends thereof and disposed concentric with said shaft and said skirt.

20. A device as recited in claim 19 wherein said vanes are planar elements extending radially outwardly as geometric extensions from the center of said shaft.

* * * * *